Oct. 10, 1944.  R. G. BRIGHT  2,360,194
BEVERAGE MAKING EQUIPMENT
Filed Nov. 27, 1943  3 Sheets-Sheet 1
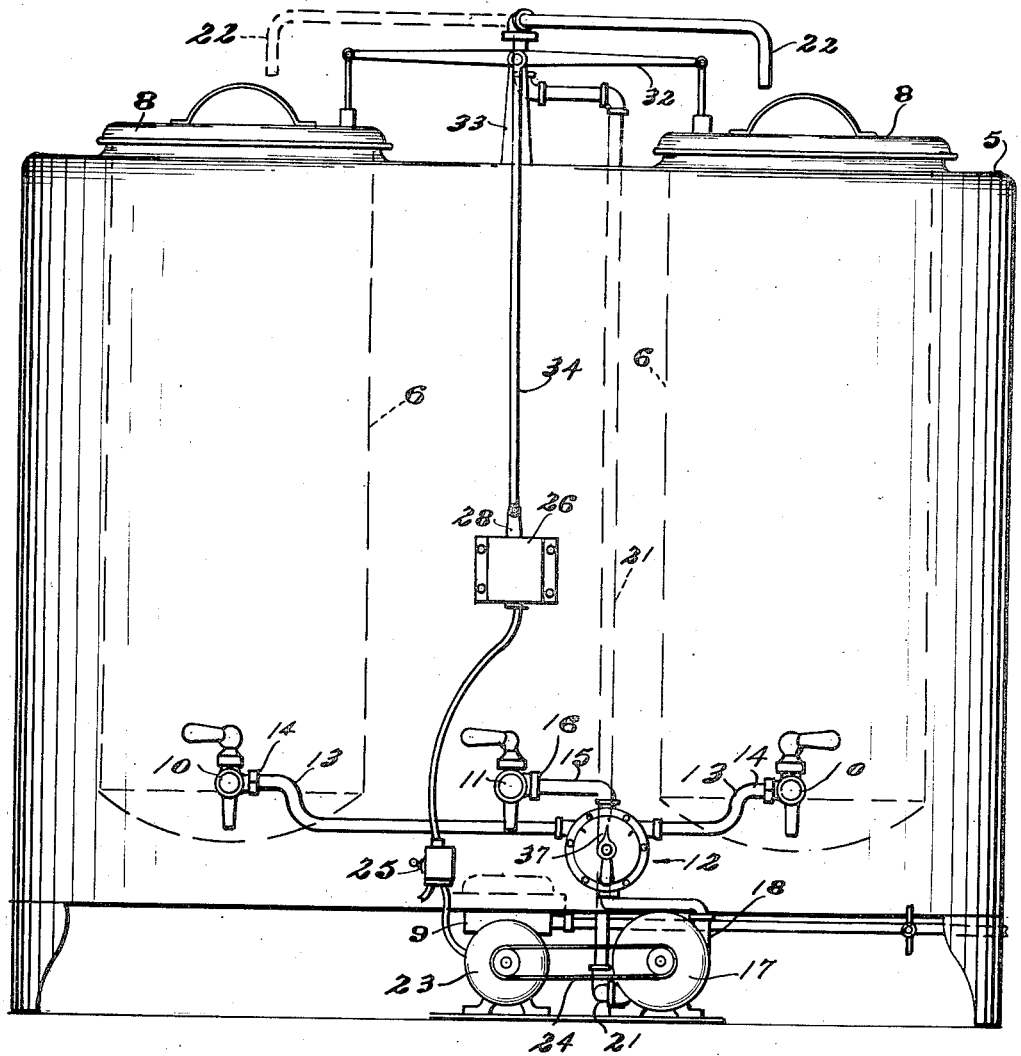
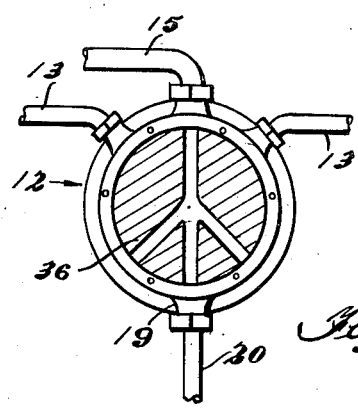
Inventor
RAYMOND G. BRIGHT

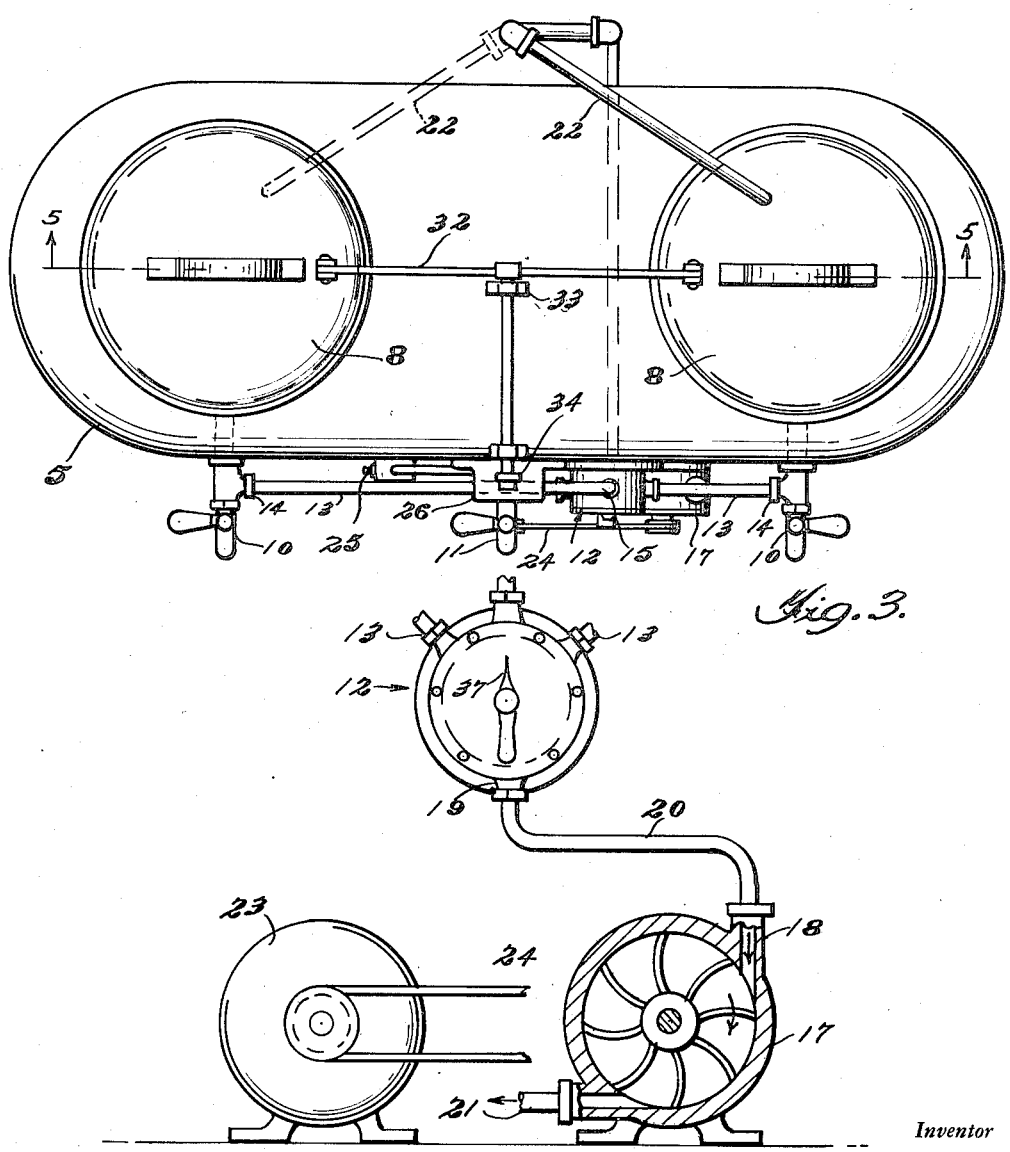

Oct. 10, 1944.  R. G. BRIGHT  2,360,194
BEVERAGE MAKING EQUIPMENT
Filed Nov. 27, 1943  3 Sheets-Sheet 3

Inventor
RAYMOND G. BRIGHT

By Clarence A. O'Brien
and Harvey B. Jacobson
Attorneys

Patented Oct. 10, 1944

2,360,194

UNITED STATES PATENT OFFICE 2,360,194

BEVERAGE-MAKING EQUIPMENT

Raymond G. Bright, El Paso, Tex.

Application November 27, 1943, Serial No. 512,071

2 Claims. (Cl. 99—291)

This invention relates to beverage-making equipment utilizing hot water, and more particularly to that suitable for the making of coffee and similar drinks.

The primary object of the invention is to provide equipment for making coffee more efficiently by providing automatically controlled means for circulating the coffee liquid.

A further object is to provide a special control means for the liquid circulating means, whereby the equipment may be operated in a most desirable manner.

In the usual coffee urn equipment, arrangement is made for the manual feeding of hot water and the coffee liquid to the ground coffee receptacle. The present invention eliminates the dangerous and difficult features of making coffee in urns by providing a means for circulating the hot water or liquid coffee for wetting the ground coffee, which means requires the simplest manipulation to cause it to direct the hot water and coffee liquid through their routine of processing.

The present invention consists in the novel form, combination and arrangement of parts hereinafter more fully described, shown in the accompanying drawings and claimed.

In the drawings, wherein like reference characters indicate corresponding parts throughout the several views:

Figure 1 is an elevational view of coffee-making equipment of the urn type constructed in accordance with the present invention.

Figure 2 is an enlarged view showing the special control valve forming part of the equipment of Figure 1, with the cover plate of the valve casing removed and the rotatable valve member in section.

Figure 3 is a top plan view of the equipment shown in Figure 1.

Figure 4 is a fragmentary view partly in elevation and partly in vertical section, the view being on an enlarged scale to more clearly show the control valve, the liquid circulating pump, and the driving motor for the pump.

Figure 5:
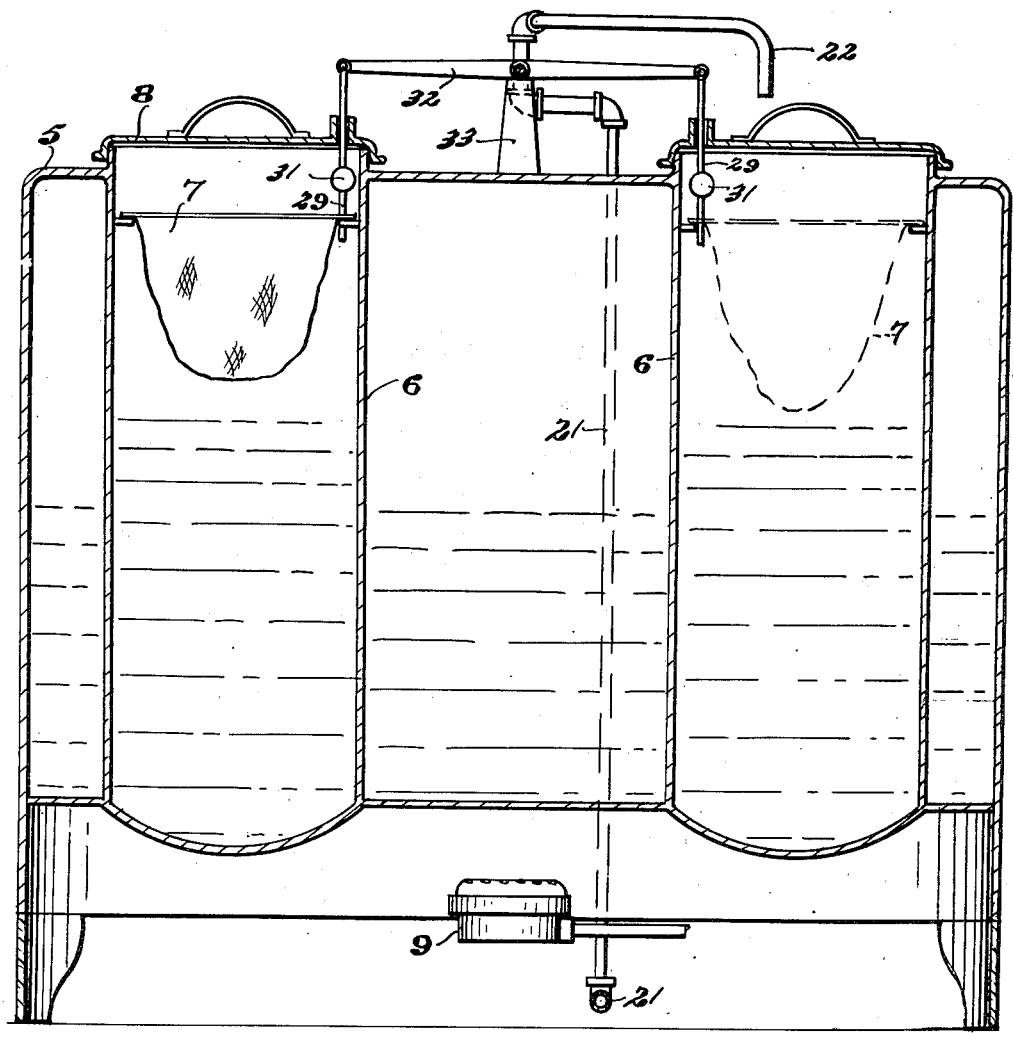
Figure 5 is a vertical section taken on the plane of line 5—5 of Figure 3.

For purposes of illustration, I show an urn having an outer casing 5 which forms a boiler in which water is adapted to be maintained at a suitable level and to which the water is supplied by the usual water inlet pipe, not shown, leading from a water source of supply. Spaced liquid coffee receptacles 6 are provided within the boiler 5, and suitable foraminous ground coffee receptacles are supported within the upper portions of the liquid coffee receptacles 6, as at 7. The liquid coffee receptacles 6 have covers 8, and the water in boiler 5 is heated by a suitable burner 9. Faucets 10 are provided on the outside of the casing and are connected to the liquid coffee receptacle 6 for the withdrawal of liquid coffee therefrom. A similar faucet 11 is provided on the outside of casing 5 between the coffee receptacles 6 for the withdrawal of hot water from the boiler. Suitable liquid coffee gauges and a water gauge may be provided to be read from the exterior of the casing in a well known manner.

In combination with the foregoing structure, I provide a three-way control valve 12, preferably of the rotatable core type, two of whose inlet ports are respectively connected by pipes 13 with the connections of faucets 10 to the receptacles 6, as at 14. The other inlet of valve 12 is connected by a pipe 15 with the connection between faucet 11 and casing 5, as at 16. A pump 17 is suitably mounted below valve 12 and has its inlet 18 connected with the outlet 19 of valve 12 by means of a pipe 20. A discharge pipe 21 extends from the outlet of pump 17 under the boiler 5 and then upwardly in back of the latter to a point above the top of the same where it is equipped with a horizontally swinging swiveled outlet spout 22. The spout 22 is arranged so that it may be swung either to a position with its discharge end over the top of one liquid coffee receptacle 6 or to a position with its discharge end over the top of the other liquid coffee receptacle 6. Thus, liquid discharged from spout 22 may be directed into the top of either liquid coffee receptacle, as desired.

An electric motor 23 is mounted adjacent pump 17 and is used to drive the pump 17 through a belt gearing 24, or the like. A manual switch 25 is provided to control the supply of current to one contact of a pair of coacting contacts 27 and 27a of a float-actuated switch 26. Switch 26 further includes a lever 28 pivoted in and extending upwardly through the top of the casing of said switch 26, the short lower arm of lever 28 being extended downwardly to cause normal engagement of the pair of contacts provided at 27 and 27a. Thus, by swinging lever 28 in either direction, the contact at 27a may be allowed to spring away from contact 27 so as to open the circuit of motor 23 at this point. In either case, the switch 25 will of course have to be closed in order that the engagement of the contacts 27 and 27a may render the motor operative.

Guided for vertical movement in the upper portions of the receptacles 6 are float rods 29 having floats 31 above the ground coffee receptacles 7. The upper ends of float rods 29 slidably project through the covers 8 and are loosely and pivotally connected with the opposite ends of a further lever 32 fixed intermediate its ends upon a supporting rock shaft journaled in bracket 33 mounted on top of the casing 5. This rock shaft has a depending arm 34 fixed thereon, and the lower end of this arm is loosely and pivotally connected to the upper end of switch lever 28 by a pin and slot connection 35.

The rotatable core of valve 12 is shown at 36, and an indicator including a pointer 37 movable with the valve member 36 is provided on the outside of the casing of valve 12 to show the position of said valve member 36, so that the desired flow of liquid may be surely obtained upon operation of this control valve.

Figure 6:
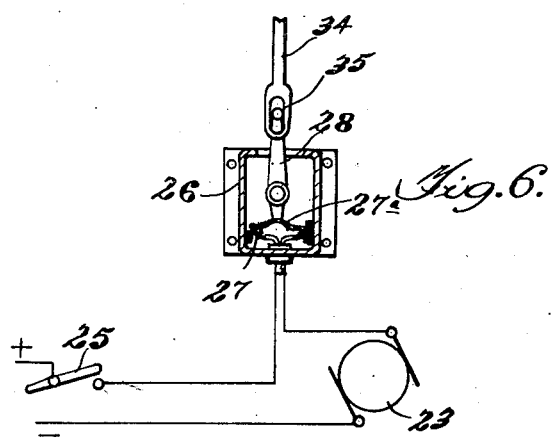
Figure 6 is a view partly diagrammatic and partly sectional, showing the control switch for the pump driving motor.

In use, water is supplied to boiler 5 and heated by burner 9. By lifting and laterally swinging the cover 8 of the left hand receptacle 6, a ground coffee receptacle 7 containing ground coffee may be placed in position at the top of said receptacle 6. The valve 12 is then operated so as to provide communication between the boiler and pump 17 by way of pipes 15 and 20, the valve member 36 being positioned as shown in Figure 2. Switch 25 is then operated so that the circuit of motor 23 will be closed, whereupon said motor drives pump 17 for drawing the hot water from boiler 5 and discharging it through pipe 21 and spout 22 into the top of receptacle 6 whose cover has been previously opened and over which the spout 22 has been swung, as indicated by dotted lines in Figures 1 and 3. As the hot water will discharge from spout 22 faster than it will seep through the ground coffee in the receptacle 7, the level of liquid will rise above the latter so that it will act upon the float 31 to raise the associated float rod 29 and swing lever 32 in a direction to cause arm 34 to swing to the left of Figure 6. When this occurs, contact 27a is permitted to disengage from contact 27 so as to open the motor circuit and discontinue the operation of pump 17 and the supply of hot water to the left hand receptacle 6. When the level of water in receptacle 7 of this left hand liquid coffee receptacle 6 lowers, float 31 will lower so as to automatically cause engagement of the contact 27a with contact 27 again, thereby rendering the motor 23 operative again for resuming the supply of hot water to the left hand receptacle 6. This cycle is repeated as long as necessary to complete the coffee brewing operation, whereupon switch 25 is manually opened, the lid 8 of left hand receptacle 6 is closed, and spout 22 is swung out of the way. However, during this cycle of operation, and a short time after the brewing operation has been started, the valve 12 will be operated to disconnect pipe 20 from pipe 15 and connect it with pipe 13 of the left hand receptacle 6 so that in the remainder of the brewing operation, the liquid coffee will be re-circulated or drawn from the left hand receptacle 6 and returned to the top thereof through spout 22. In other words, only enough hot water is drawn from the boiler to make the necessary amount of liquid coffee in the receptacle 6, the brewing operation being completed by simply circulating the liquid coffee through the coffee grounds in receptacle 7 until completion of the operation. It will be understood that while coffee is being made in the receptacle 6, coffee may be dispensed from the right hand receptacle 6. When desired, the same brewing operation may be carried on with respect to the right hand receptacle 6.

From the foregoing description, it is believed that the construction and operation of the present invention, as well as the advantages thereof, will be readily understood and appreciated by those skilled in the art. Minor changes in the details of construction illustrated and described are contemplated, such as fairly fall within the spirit and scope of the invention as claimed.

What I claim as new is:

1. Beverage making equipment comprising a liquid coffee receptacle, a ground coffee receptacle in the upper portion of said liquid coffee receptacle, a boiler, a pump having a discharge pipe, and an electric driving motor, said discharge pipe being adapted to discharge into the liquid coffee receptacle above the ground coffee receptacle, pipe connections and a manually operable control valve for selectively placing the inlet of said pump in communication with the boiler or in communication with the liquid coffee receptacle, a normally closed switch for controlling the circuit of said motor at one point, a float arranged in the liquid coffee receptacle above the ground coffee receptacle and operatively connected to said switch for opening the circuit of said motor at said point when the water or liquid coffee supplied by the pump to the ground coffee receptacle fills the latter and rises above the same and for closing the circuit at said point when the level of said supplied water or liquid coffee lowers into the ground coffee receptacle by seeping through the latter, and a manually operable switch for controlling the motor circuit at another point.

2. Beverage making equipment comprising a boiler, two liquid coffee receptacles within the boiler, ground coffee receptacles in the upper portions of said liquid coffee receptacles, a pump having a discharge pipe and an electric driving motor, said discharge pipe having a horizontally swinging swiveled discharge spout movable to discharge into either desired one of said liquid coffee receptacles above the ground coffee receptacles thereof, pipe connections and a manually operable control valve for selectively placing the inlet of said pump in communication with the boiler or either desired one of said liquid coffee receptacles, a normally closed switch for controlling the circuit of said motor at one point, floats arranged in the liquid coffee receptacles above the ground coffee receptacles thereof and operatively connected to said switch for opening the circuit of said motor at said point when the water or liquid coffee supplied by the pump to either ground coffee receptacle fills the latter and rises above the same and for closing the circuit at said point when the level of said supplied water or liquid coffee lowers into said ground coffee receptacle by seeping through the latter, and a manually operable switch for controlling the motor circuit at another point.

RAYMOND G. BRIGHT.